(12) United States Patent
Dai et al.

(10) Patent No.: US 12,395,957 B2
(45) Date of Patent: Aug. 19, 2025

(54) METHOD AND APPARATUS OF SYSTEM INFORMATION TRANSMISSION

(71) Applicant: ZTE CORPORATION, Guangdong (CN)

(72) Inventors: Jianqiang Dai, Shenzhen (CN); Nan Zhang, Shenzhen (CN); Jianwu Dou, Shenzhen (CN); Wei Cao, Shenzhen (CN); Chenchen Zhang, Shenzhen (CN)

(73) Assignee: ZTE Corporation, Shenzhen (CN)

( * ) Notice: Subject to any disclaimer, the term of this patent is extended or adjusted under 35 U.S.C. 154(b) by 361 days.

(21) Appl. No.: 18/126,222

(22) Filed: Mar. 24, 2023

(65) Prior Publication Data

US 2023/0309041 A1    Sep. 28, 2023

Related U.S. Application Data

(63) Continuation of application No. PCT/CN2020/119527, filed on Sep. 30, 2020.

(51) Int. Cl.
*H04W 56/00* (2009.01)
*H04W 72/12* (2023.01)
*H04W 72/231* (2023.01)

(52) U.S. Cl.
CPC ....... *H04W 56/0045* (2013.01); *H04W 72/12* (2013.01); *H04W 72/231* (2023.01)

(58) Field of Classification Search
CPC   H04B 7/1851; H04B 7/1853; H04B 7/18539; H04B 7/1855; H04W 48/10; H04W 56/0005; H04W 56/0045; H04W 56/0453; H04W 72/0446; H04W 72/046; H04W 72/12; H04W 72/23; H04W 72/231; H04W 84/06; Y02D 30/70
See application file for complete search history.

(56) References Cited

U.S. PATENT DOCUMENTS

| | | | | |
|---|---|---|---|---|
| 9,967,805 B2* | 5/2018 | Brismar | ............. | H04W 28/082 |
| 10,123,307 B2* | 11/2018 | Takahashi | ............ | H04W 8/005 |
| 10,701,647 B2* | 6/2020 | Kim | .................... | H04L 27/2626 |
| 10,736,088 B2* | 8/2020 | Ryu | ..................... | H04L 5/0094 |
| 11,109,332 B2* | 8/2021 | Xue | .................. | H04W 72/0453 |
| 11,316,645 B2* | 4/2022 | Si | ......................... | H04L 5/0064 |
| 11,330,541 B2* | 5/2022 | Zhang | ................ | H04W 56/001 |
| 11,395,167 B2* | 7/2022 | Si | .......................... | H04W 48/12 |

(Continued)

FOREIGN PATENT DOCUMENTS

| CN | 111727658 A | 9/2020 |
|---|---|---|
| EP | 4 099 602 A1 | 12/2022 |

(Continued)

OTHER PUBLICATIONS

Extended European Search Report on EP Appln No. 20955742.0, dated Dec. 22, 2023 (10 pages).

(Continued)

*Primary Examiner* — Eric Nowlin
(74) *Attorney, Agent, or Firm* — Foley & Lardner LLP

(57) ABSTRACT

A system and method for system information transmission. The system and method include broadcasting, by a wireless communication node to a wireless communication device, a system information block that indicates configuration of different resources.

4 Claims, 11 Drawing Sheets

(56) References Cited

U.S. PATENT DOCUMENTS

| | | | |
|---|---|---|---|
| 11,418,308 B2* | 8/2022 | Matsumura | H04L 5/0012 |
| 11,576,165 B2* | 2/2023 | Ryu | H04W 72/23 |
| 11,856,544 B2* | 12/2023 | Singh | H04W 56/0045 |
| 11,864,012 B2* | 1/2024 | Si | H04W 48/12 |
| 2014/0301353 A1* | 10/2014 | Frenne | H04W 48/10 |
| | | | 370/330 |
| 2018/0049168 A1* | 2/2018 | Ryu | H04L 5/00 |
| 2018/0279237 A1* | 9/2018 | Kim | H04L 27/2626 |
| 2019/0174438 A1* | 6/2019 | Zhang | H04W 56/001 |
| 2020/0068512 A1* | 2/2020 | Xue | H04L 5/0082 |
| 2020/0367213 A1* | 11/2020 | Ryu | H04W 72/23 |
| 2021/0028907 A1* | 1/2021 | Matsumura | H04L 5/0012 |
| 2021/0067298 A1* | 3/2021 | Si | H04L 5/0048 |
| 2021/0127283 A1* | 4/2021 | Si | H04W 24/08 |
| 2022/0007455 A1 | 1/2022 | Hong | |
| 2022/0141784 A1* | 5/2022 | Singh | H04W 56/0015 |
| | | | 370/350 |
| 2022/0191840 A1* | 6/2022 | Si | H04L 5/0007 |
| 2022/0338040 A1* | 10/2022 | Si | H04L 5/0048 |
| 2022/0386143 A1* | 12/2022 | Gunturu | H04B 7/0695 |
| 2023/0254794 A1* | 8/2023 | Park | H04B 7/18513 |
| | | | 370/316 |
| 2023/0292269 A1* | 9/2023 | Liu | H04W 56/003 |
| 2023/0309041 A1* | 9/2023 | Dai | H04B 7/1853 |
| 2023/0345474 A1* | 10/2023 | Ma | H04L 5/0092 |
| 2024/0064669 A1* | 2/2024 | Grant | H04W 48/12 |
| 2024/0276296 A1* | 8/2024 | Liu | H04W 72/0453 |

FOREIGN PATENT DOCUMENTS

| | | |
|---|---|---|
| WO | WO-2020/071698 A1 | 4/2020 |
| WO | WO-2020/101908 A1 | 5/2020 |
| WO | WO-2020/182006 A1 | 9/2020 |
| WO | WO-2021/164579 | 8/2021 |

OTHER PUBLICATIONS

International Search Report and Written Opinion for PCT Appl. No. PCT/CN2020/119527 mailed Jul. 7, 2021 (11 pages).

Mediatek Inc.: "Physical layer control procedure in NR-NTN" 3GPP TSG RAN WG1 Meeting #97; R1-1906467; May 19, 2019; Reno, Nevada (5 pages).

Moderator (Ericsoon): "Feature lead summary #4 on timing relationship enhancements" 3GPP TSG-RAN WG1 Meeting #102-e; R1-2007323; Aug. 28, 2020; e-Meeting (83 pages).

Examination Report No. 2 for AU Appl. No. 2020470208, dated May 27, 2024 (4 pages).

* cited by examiner

METHOD AND APPARATUS OF SYSTEM INFORMATION TRANSMISSION

CROSS-REFERENCE TO RELATED APPLICATION

This application claims the benefit of priority under 35 U.S.C. § 120 as a continuation of International Patent Application No. PCT/CN2020/119527, filed on Sep. 30, 2020, the disclosure of which is incorporated herein by reference in its entirety.

TECHNICAL FIELD

The disclosure relates generally to wireless communications and, more particularly, to systems and methods of system information transmission.

BACKGROUND

The standardization organization Third Generation Partnership Project (3GPP) is currently in the process of specifying a new Radio Interface called 5G New Radio (5G NR). With the development of 5G NR, a broad range of use cases including enhanced mobile broadband, massive machine-type communications (MTC), critical MTC, etc., can be realized. To expand the utilization of NR access technologies, 5G connectivity via satellites and/or airborne vehicles is being considered as a promising application.

SUMMARY

The example embodiments disclosed herein are directed to solving the issues relating to one or more of the problems presented in the prior art, as well as providing additional features that will become readily apparent by reference to the following detailed description when taken in conjunction with the accompany drawings. In accordance with various embodiments, example systems, methods, devices and computer program products are disclosed herein. It is understood, however, that these embodiments are presented by way of example and are not limiting, and it will be apparent to those of ordinary skill in the art who read the present disclosure that various modifications to the disclosed embodiments can be made while remaining within the scope of this disclosure.

In one aspect, a method includes broadcasting, by a wireless communication node to a wireless communication device, a system information block that indicates configuration of different resources.

In some embodiments, the configuration includes at least one of a plurality of scheduling offsets, satellite status information, or time stamp information. In some embodiments, each of the plurality of scheduling offsets indicates a time-domain offset between a first resource that the wireless communication node uses for a downlink transmission and a second resource that a wireless communication device uses for an uplink transmission. In some embodiments, the method includes configuring, by the wireless communication node, a first relationship between the plurality of scheduling offsets and a plurality of synchronization signal blocks. In some embodiments, the method includes broadcasting, by the wireless communication node, the plurality of synchronization signal blocks and a system information block, thereby causing a wireless communication device that received one of the plurality of synchronization signal blocks and the system information block to determine one of the plurality of scheduling offsets. In some embodiments, the method includes broadcasting, by the wireless communication node, a physical broadcast channel (PBCH) and a system information block, thereby causing a wireless communication device that received the PBCH and the system information block to determine one of the plurality of scheduling offsets.

In some embodiments, the first relationship indicates association between each of the plurality of scheduling offsets and one or more of the plurality of synchronization signal blocks. In some embodiments, the method includes configuring, by the wireless communication node, a second relationship between the plurality of scheduling offsets and a plurality of beam-related parameters. In some embodiments, the method includes configuring, by the wireless communication node for a plurality of wireless communication devices, a same one of the beam-related parameters, thereby causing the wireless communication devices to at least one of: use a same SSB or CSI-RS, wherein the used SSB or CSI-RS is Quasi Co-Location with a used port; use a same polarization pattern; use a same frequency resource; or use a same spatial resource.

In some embodiments, the beam-related parameters include a plurality of a virtual beam indices. In some embodiments, the beam-related parameters include a plurality of transmission configuration indication states. In some embodiments, the second relationship indicates association between each of the plurality of scheduling offsets and one or more of the plurality of transmission configuration indication states. In some embodiments, the beam-related parameters include a plurality of geographic reference points that correspond to a plurality of transmission beams used by the wireless communication node, respectively. In some embodiments, the beam-related parameters include a plurality of frequency-domain resources that correspond to a plurality of transmission beams used by the wireless communication node, respectively.

In some embodiments, the method includes configuring, by the wireless communication node for a wireless communication device, a first one of the plurality of resources; and configuring, by the wireless communication node for the wireless communication device, a second one of the plurality of resources, wherein a second one of the plurality of scheduling offsets that corresponds to the second resource is updated from a first one of the plurality of scheduling offsets that corresponds to the first resource. In some embodiments, the system information block includes SIB 1. In some embodiments, the configuration includes a at least one of, single scheduling offset, satellite status information, or time stamp information. In some embodiments, the resource includes corresponding cell identity. In some embodiments, the single scheduling offset is broadcasted in SIB 1. In some embodiments, the single scheduling offset indicates a time-domain offset between a first resource that the wireless communication node uses for a downlink transmission and a second resource that a wireless communication device uses for an uplink transmission.

In some embodiments, the method includes broadcasting, by the wireless communication node, a system information block in TDM resource or FDM resource, thereby causing a wireless communication device that received the system information block to determine the scheduling offset. In some embodiments, the method includes broadcasting, by the wireless communication node, a system information block in narrow frequency band or a carrier, thereby causing a wireless communication device that received the system information block to determine the scheduling offset. In some embodiments, the method includes configuring, by the wireless communication node, a relationship between the scheduling offset and one or more of a plurality of transmission configuration indication states. In some embodiments, the method includes configuring, by the wireless communication node, the single scheduling offset corresponding to a virtual beam index. In some embodiments, the method includes configuring, by the wireless communication node for a plurality of wireless communication devices, a same one of a plurality of virtual beam indices, thereby causing the wireless communication devices to at least one of: use a same SSB or CSI-RS, wherein the used SSB or CSI-RS is Quasi Co-Location with a used port; use a same polarization pattern; use a same frequency resource; or use a same spatial resource.

In some embodiments, the method includes configuring, by the wireless communication node, the single scheduling offset that corresponds to a geographic reference point that corresponds to a transmission beam used by the wireless communication node. In some embodiments, the method includes comprising configuring, by the wireless communication node, a scheduling offset that corresponds to a frequency-domain resource. In some embodiments, the system information block includes SIB 1. In some embodiments, the system information block is different from SIB 1.

In another aspect, a method includes sending, by a wireless communication node to a group of wireless communication devices, a common scheduling offset. In some embodiments, the method includes broadcasting, by the wireless communication node, a system information block that indicates the common scheduling offset. In some embodiments, the method includes multicasting, by the wireless communication node to the group of wireless communication devices, the common scheduling offset in a downlink transmission. In some embodiments, the method includes configuring, by the wireless communication node, the common scheduling offset corresponding to a virtual group index. In some embodiments, the method includes configuring, by the wireless communication node, the common scheduling offset that corresponds to a frequency-domain resource.

In some embodiments, the configuration includes at least one of: a common value of timing advance, a common value for frequency pre-compensation for downlink. In some embodiments, the different resources include at least one of different BWPs, different narrow frequency bands or carriers, different virtual beams index. In some embodiments, the method includes broadcasting, by the wireless communication node to a wireless communication device, a system information block in a granted time gap. In some embodiments, the satellite status information includes at least one of: a location of a satellite, or an ephemeris of the satellite.

In another aspect, a method includes receiving, by a wireless communication device from a wireless communication node, a system information block that indicates configuration of different resources.

In some embodiments, the configuration includes at least one of a plurality of scheduling offsets, satellite status information, or time stamp information. In some embodiments, each of the plurality of scheduling offsets indicates a time-domain offset between a first resource that the wireless communication node uses for a downlink transmission and a second resource that the wireless communication device uses for an uplink transmission. In some embodiments, the wireless communication node configured a first relationship between the plurality of scheduling offsets and a plurality of synchronization signal blocks. In some embodiments, the method includes receiving, by the wireless communication device, one of the plurality of synchronization signal blocks and a system information block; and determining, by the wireless communication device, one of the plurality of scheduling offsets. In some embodiments, the method includes receiving, by the wireless communication device, a physical broadcast channel (PBCH) and a system information block; and determining, by the wireless communication device, one of the plurality of scheduling offsets. In some embodiments, the first relationship indicates association between each of the plurality of scheduling offsets and one or more of the plurality of synchronization signal blocks.

In some embodiments, the wireless communication node configured a second relationship between the plurality of scheduling offsets and a plurality of beam-related parameters. In some embodiments, the wireless communication node is configured for a plurality of wireless communication devices, a same one of the beam-related parameters and the method further includes using, by the wireless communication device, at least one of a same SSB or CSI-RS, wherein the used SSB or CSI-RS is Quasi Co-Location with a used port; a same polarization pattern; a same frequency resource; or a same spatial resource.

In some embodiments, the beam-related parameters include a plurality of a virtual beam indices. In some embodiments, the beam-related parameters include a plurality of transmission configuration indication states. In some embodiments, the second relationship indicates association between each of the plurality of scheduling offsets and one or more of the plurality of transmission configuration indication states. In some embodiments, the beam-related parameters include a plurality of geographic reference points that correspond to a plurality of transmission beams used by the wireless communication node, respectively. In some embodiments, the beam-related parameters include a plurality of frequency-domain resources that correspond to a plurality of transmission beams used by the wireless communication node, respectively. In some embodiments, the wireless communication node: configured a first one of the plurality of resources for the wireless communication device; and configured a second one of the plurality of resources for the wireless communication device. In some embodiments, a second one of the plurality of scheduling offsets that corresponds to the second resource is updated from a first one of the plurality of scheduling offsets that corresponds to the first resource.

In some embodiments, the system information block includes SIB 1. In some embodiments, the configuration includes a at least one of, single scheduling offset, satellite status information, or time stamp information. In some embodiments, the resource includes corresponding cell identity. In some embodiments, the single scheduling offset is broadcasted in SIB 1. In some embodiments, the single scheduling offset indicates a time-domain offset between a first resource that the wireless communication node uses for a downlink transmission and a second resource that the wireless communication device uses for an uplink transmission.

In some embodiments, the method includes receiving, by the wireless communication device, a system information block in TDM resource or FDM resource; and determining, by the wireless communication device, the scheduling offset. In some embodiments, the method includes receiving, by the wireless communication device, a system information block in narrow frequency band or a carrier; and determining, by the wireless communication device, the scheduling offset. In some embodiments, the wireless communication node configured a relationship between the scheduling offset and one or more of a plurality of transmission configuration indication states. In some embodiments, the wireless communication node configured the single scheduling offset corresponding to a virtual beam index. In some embodiments, the wireless communication node configured, for a plurality of wireless communication devices, a same one of a plurality of virtual beam indices and further comprising using, by the wireless communication device, at least one of a same SSB or CSI-RS, wherein the used SSB or CSI-RS is Quasi Co-Location with a used port; a same polarization pattern; a same frequency resource; or a same spatial resource.

In some embodiments, wherein the wireless communication node configured the single scheduling offset that corresponds to a geographic reference point that corresponds to a transmission beam used by the wireless communication node. In some embodiments, the wireless communication node configured a scheduling offset that corresponds to a frequency-domain resource. In some embodiments, the system information block includes SIB 1. In some embodiments, the system information block is different from SIB 1.

In another aspect, the method includes receiving, by the wireless communication device from the wireless communication node, a common scheduling offset.

In some embodiments, the wireless communication node configured the common scheduling offset corresponding to a virtual group index. In some embodiments, the wireless communication node configured the common scheduling offset that corresponds to a frequency-domain resource. In some embodiments, the configuration includes at least one of: a common value of timing advance, a common value for frequency pre-compensation for downlink. In some embodiments, the different resources include at least one of different BWPs, different narrow frequency bands or carriers, different virtual beams index. In some embodiments, the method includes receiving, by the wireless communication device from the wireless communication node, a system information block in a granted time gap. In some embodiments, the satellite status information includes at least one of: a location of a satellite, or an ephemeris of the satellite.

The above and other aspects and their embodiments are described in greater detail in the drawings, the descriptions, and the claims.

BRIEF DESCRIPTION OF THE DRAWINGS

Various example embodiments of the present solution are described in detail below with reference to the following figures or drawings. The drawings are provided for purposes of illustration only and merely depict example embodiments of the present solution to facilitate the reader's understanding of the present solution. Therefore, the drawings should not be considered limiting of the breadth, scope, or applicability of the present solution. It should be noted that for clarity and ease of illustration, these drawings are not necessarily drawn to scale.

DETAILED DESCRIPTION OF EXEMPLARY EMBODIMENTS

Figure 1:
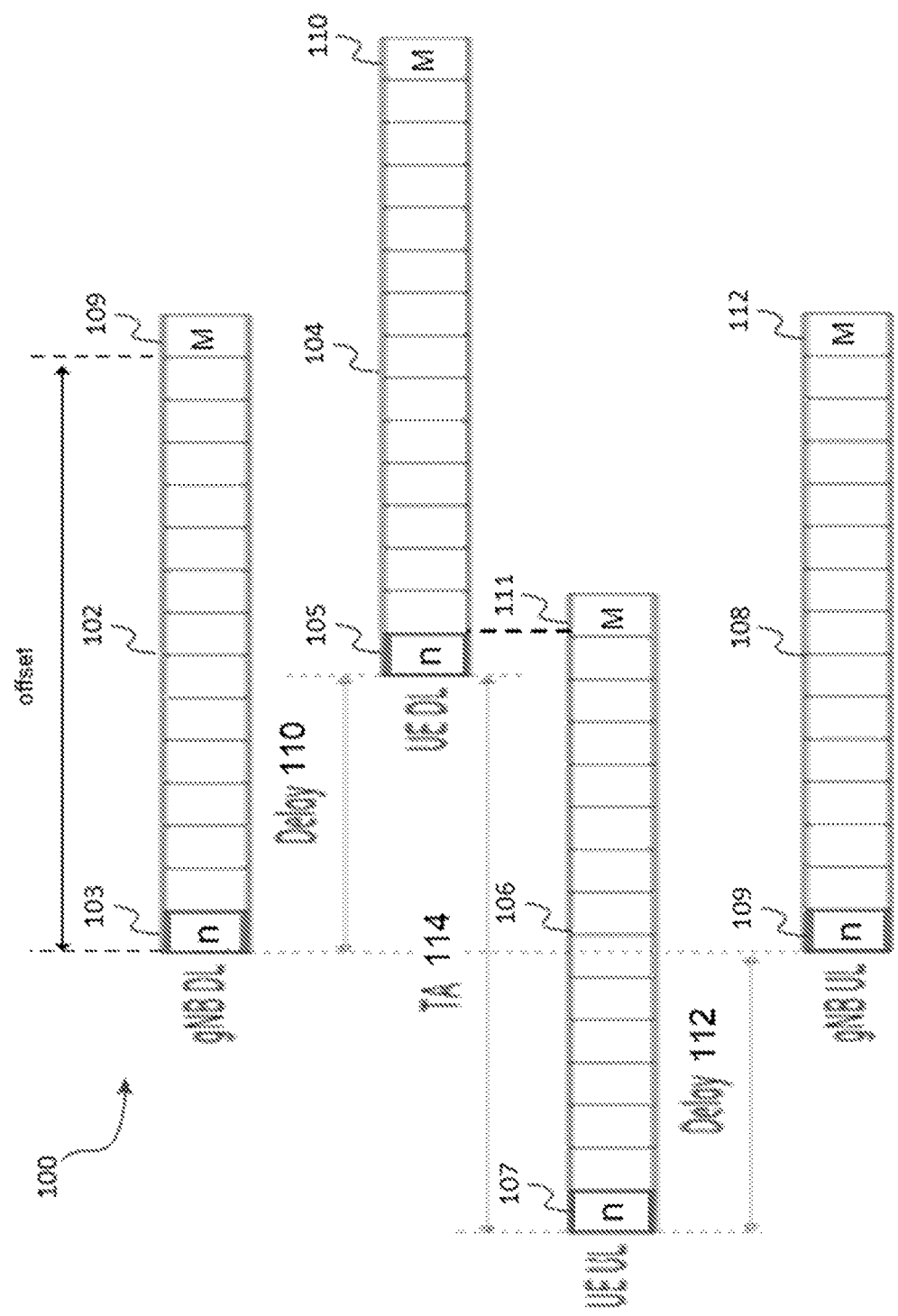
FIG. 1 is a block diagram depicting an example environment of a timing advance (TA) in NR, in accordance with an embodiment of the present disclosure.

Various example embodiments of the present solution are described below with reference to the accompanying figures to enable a person of ordinary skill in the art to make and use the present solution. As would be apparent to those of ordinary skill in the art, after reading the present disclosure, various changes or modifications to the examples described herein can be made without departing from the scope of the present solution. Thus, the present solution is not limited to the example embodiments and applications described and illustrated herein. Additionally, the specific order or hierarchy of steps in the methods disclosed herein are merely example approaches. Based upon design preferences, the specific order or hierarchy of steps of the disclosed methods or processes can be re-arranged while remaining within the scope of the present solution. Thus, those of ordinary skill in the art will understand that the methods and techniques disclosed herein present various steps or acts in a sample order, and the present solution is not limited to the specific order or hierarchy presented unless expressly stated otherwise.

The following acronyms are used throughout the present disclosure:
3GPP 3rd Generation Partnership Project
5G 5th Generation Mobile Networks
5G-AN 5G Access Network
5G gNB Next Generation NodeB
BS Base Station
BWP Bandwidth Part
CE Control Element
DCI Downlink Control Information
DL Down Link or Downlink
eNB Evolved Node B
ETSI European Telecommunications Standards Institute
FDD Frequency Division Duplex
FDM Frequency Division Multiplexing
LBT Listen Before Talk/Listen Before Send
LTE Long Term Evolution
MAC Medium Access Control MSC Mobile Switching Center
NAS Non-Access Stratum
NR Next Generation RAN
OFDM Orthogonal Frequency-Division Multiplexing
OFDMA Orthogonal Frequency-Division Multiple Access
OSI Open Systems Interconnection
PDCP Packet Data Convergence Protocol
RAN Radio Access Network
RLC Radio Link Control
RNTI radio Network Temporary Identifier
RRC Radio Resource Control
RV Redundancy Version
SCS Sub-Carrier Spacing
SFN System Frame Number
SIB System Information Block
SSB Synchronization Signal Block
TCI Transmission Configuration Indicator
UE User Equipment
UL Up Link or Uplink Due to the distance between a satellite and the ground of earth and the quick movement of the satellite, a long propagation distance/delay and/or a large Doppler frequency shift may be issues for a satellite communication system. Along with satellite communication cases supported by 5G NR, a large timing advance (TA) would be conducted, and a corresponding parameter Koffset was introduced for maintaining the timing relationship involving DL-UL timing interaction.

Regarding the broadcast system information, the network (e.g., BS 204 in FIG. 2) broadcasts a synchronization signal block (SSB) in the cell that includes and/or is indicative of a synchronization signal and/or master information block (MIB) information. The UE (e.g., UE 204 in FIG. 2) may synchronize with the network on the downlink by detecting the SSB and/or acquire (e.g., obtain, gather) the information in MIB, e.g. basic configuration information in a cell, system frame number (SFN), subcarrier spacing (SCS), SSB index, and/or frequency information, etc.

The MIB may also include control information on subsequent SIB 1 broadcasting. As such, the UE may decode (e.g., decipher, decrypt) the SIB 1 information with the assistance of control information in MIB. The SIB 1 may include the common configuration on RACH, physical channel, and/or paging channel.

When the BS schedules a UL transmission, a scheduling offset is configured to indicate the available UL resource in time domain for UL transmission (e.g. FDD system). For example, FIG. 1 is a block diagram depicting an example environment 100 of a timing advance (TA) in NR, in accordance with an embodiment of the present disclosure. The environment 100 includes a frame 102 (shown in FIG. 1 as, "gNB DL") that may be transmitted from a BS (e.g., BS 202 in FIG. 2) to a UE (e.g., UE 204 in FIG. 2) and containing a plurality of slots, where a first slot (e.g., in chronological order) of the plurality of slots is identified as slot 103 (shown in FIG. 1 as "n") and a last slot is identified as slot 109 (shown in FIG. 1 as, "m"). The environment 100 includes a frame 104 (shown in FIG. 1 as, "UE DL") that may be received by a UE from a BS and containing a plurality of slots, where a first slot (e.g., in chronological order) of the plurality of slots is identified as slot 105 (shown in FIG. 1 as "n") and a last slot is identified as slot 110 (shown in FIG. 1 as, "m").

The environment 100 includes a frame 106 (shown in FIG. 1 as, "UE UL") that may be transmitted from a UE to a BS and containing a plurality of slots, where a first slot (e.g., in chronological order) of the plurality of slots is identified as slot 107 (shown in FIG. 1 as "n") and a last slot is identified as slot 111 (shown in FIG. 1 as, "m"). The environment 100 includes a frame 108 (shown in FIG. 1 as, "gNB DL") that may be received by a BS from a UE and containing a plurality of slots, where a first slot (e.g., in chronological order) of the plurality of slots is identified as slot 109 (shown in FIG. 1 as "n") and a last slot is identified as slot 112 (shown in FIG. 1 as, "m").

Specifically, frame 102 shows the transmission of a "first" frame from the BS, and frame 104 shows the receipt of the "first" frame by the UE. Frame 106 shows the transmission of a "second" frame from the UE, and frame 108 shows the receipt of the "second" frame by the BS. As shown in FIG. 1, delay 110 indicates a delay in time between the transmission of the "first frame" (as measured at the beginning of slot 103 of frame 102) by the BS, to the receipt of the "first" frame (as measured at the beginning of slot 105 of frame 104) by the UE. Delay 112 indicates a delay in time between the transmission of the "second frame" (as measured at the beginning of slot 107 of frame 106) by the UE, to the receipt of the "second" frame (as measured at the beginning of slot 109 of frame 108) by the BS. TA 114 indicates a delay in time between the transmission of the "second frame" (as measured at the beginning of slot 107 of frame 106) by the UE, to the receipt of the "first" frame (as measured at the beginning of slot 105 of frame 104) by the UE. There is an offset (e.g., a scheduling offset) between the beginning of slot 103 to the beginning of slot 109. The scheduling offsets indicates a time-domain offset between the beginning of a first resource (slot 103) that the wireless communication node uses for a downlink transmission and the beginning of a second resource (slot 109) that a wireless communication device uses for an uplink transmission.

The procedure, in some embodiments, may be as follows: gNB DL (transmit scheduling information at gNB side) to UE DL (receive scheduling information at UE side) to UE UL (transmit UL transmission at UE side) to gNB UL (receive the UL transmission at gNB side).

A basic requirement, in some embodiments, may be that the UL transmitting time instant (e.g., slot m of frame 106) cannot be earlier than the received scheduling time instant (e.g., slot n of frame 104).

The technical problem, however, is that if the offset is configured to be very large, then additional latency may be introduced even though the requirement can be satisfied. In contrast, if the offset is not large enough, then the timing relationship involving DL-UL timing interaction may not hold (e.g., from the UE side). For example, considering scenarios where UEs are serviced by a satellite, if a cell specific offset is configured and/or broadcasted to all UEs, then a maximum value or even larger value may be adopted. In this case, the communication among one or more UEs, BSs, and/or satellites are affected by the latency issue. Moreover, if each UE is configured with a UE specific value, then large signaling overhead could negatively impact the performance of the network.

Accordingly, the systems and methods discussed herein solve the technical problem by using the SIB to configure a value or multiple values of a scheduling offset (sometimes referred to as, "Koffset") in order to result in proper scheduling latency impact and/or an acceptable signaling overhead.

1. Mobile Communication Technology and Environment

Figure 2:
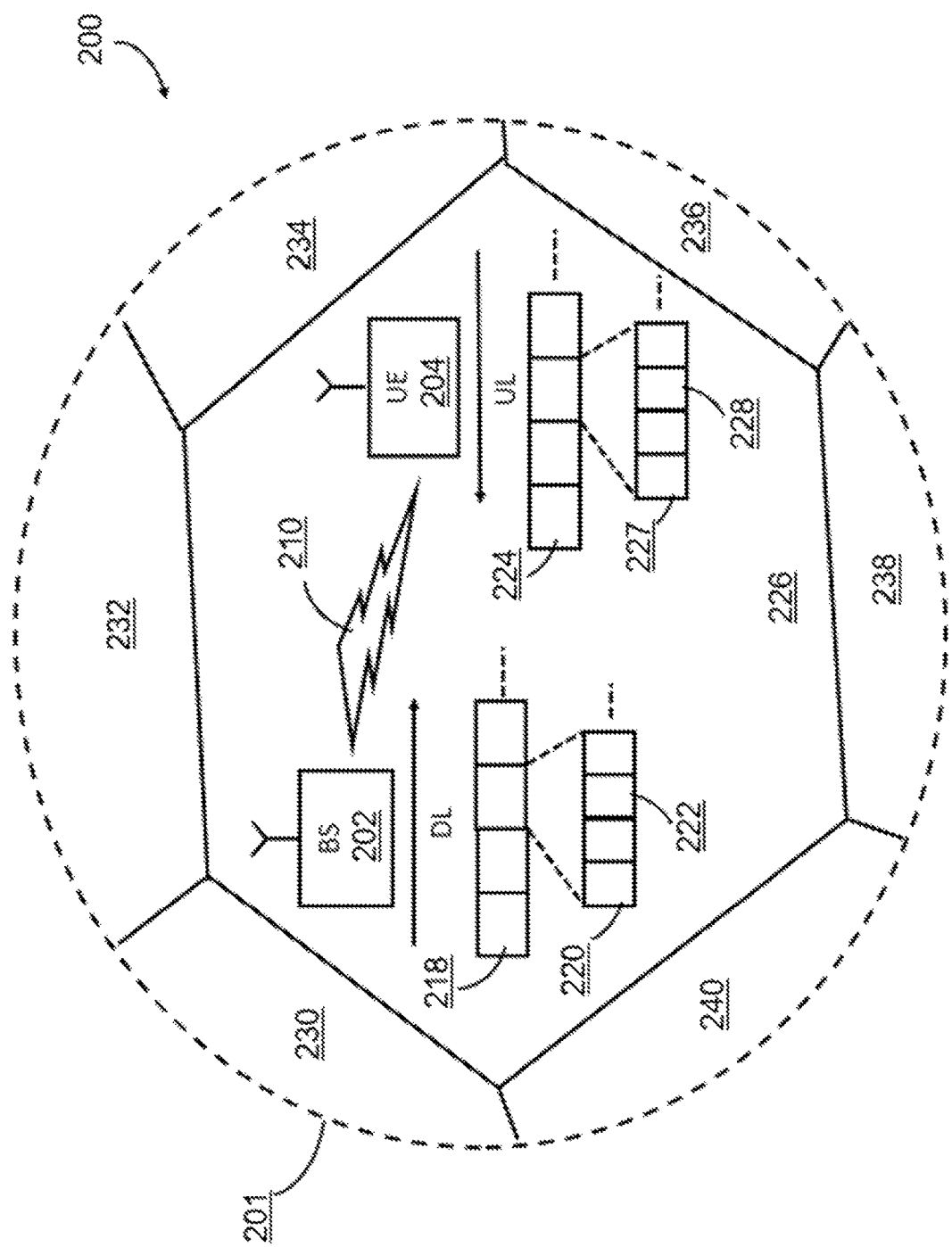
FIG. 2 illustrates an example cellular communication network in which techniques disclosed herein may be implemented, in accordance with an embodiment of the present disclosure.

FIG. 2 illustrates an example wireless communication network, and/or system, 200 in which techniques disclosed herein may be implemented, in accordance with an embodiment of the present disclosure. In the following discussion, the wireless communication network 200 may be any wireless network, such as a cellular network or a narrowband Internet of things (NB-IoT) network and is herein referred to as "network 200." Such an example network 200 includes a base station 202 (hereinafter "BS 202"; also referred to as wireless communication node) and a user equipment device 204 (hereinafter "UE 204"; also referred to as wireless communication device) that can communicate with each other via a communication link 210 (e.g., a wireless communication channel), and a cluster of cells 226, 230, 232, 234, 236, 238 and 240 overlaying a geographical area 201. In FIG. 2, the BS 202 and UE 204 are contained within a respective geographic boundary of cell 226. Each of the other cells 230, 232, 234, 236, 238 and 240 may include at least one base station operating at its allocated bandwidth to provide adequate radio coverage to its intended users.

For example, the BS 202 may operate at an allocated channel transmission bandwidth to provide adequate coverage to the UE 204. The BS 202 and the UE 204 may communicate via a downlink radio frame 218, and an uplink radio frame 224 respectively. Each radio frame 218/224 may be further divided into sub-frames 220/227 which may include data symbols 222/228. In the present disclosure, the BS 202 and UE 204 are described herein as non-limiting examples of "communication nodes," generally, which can practice the methods disclosed herein. Such communication nodes may be capable of wireless and/or wired communications, in accordance with various embodiments of the present solution.

Figure 3:
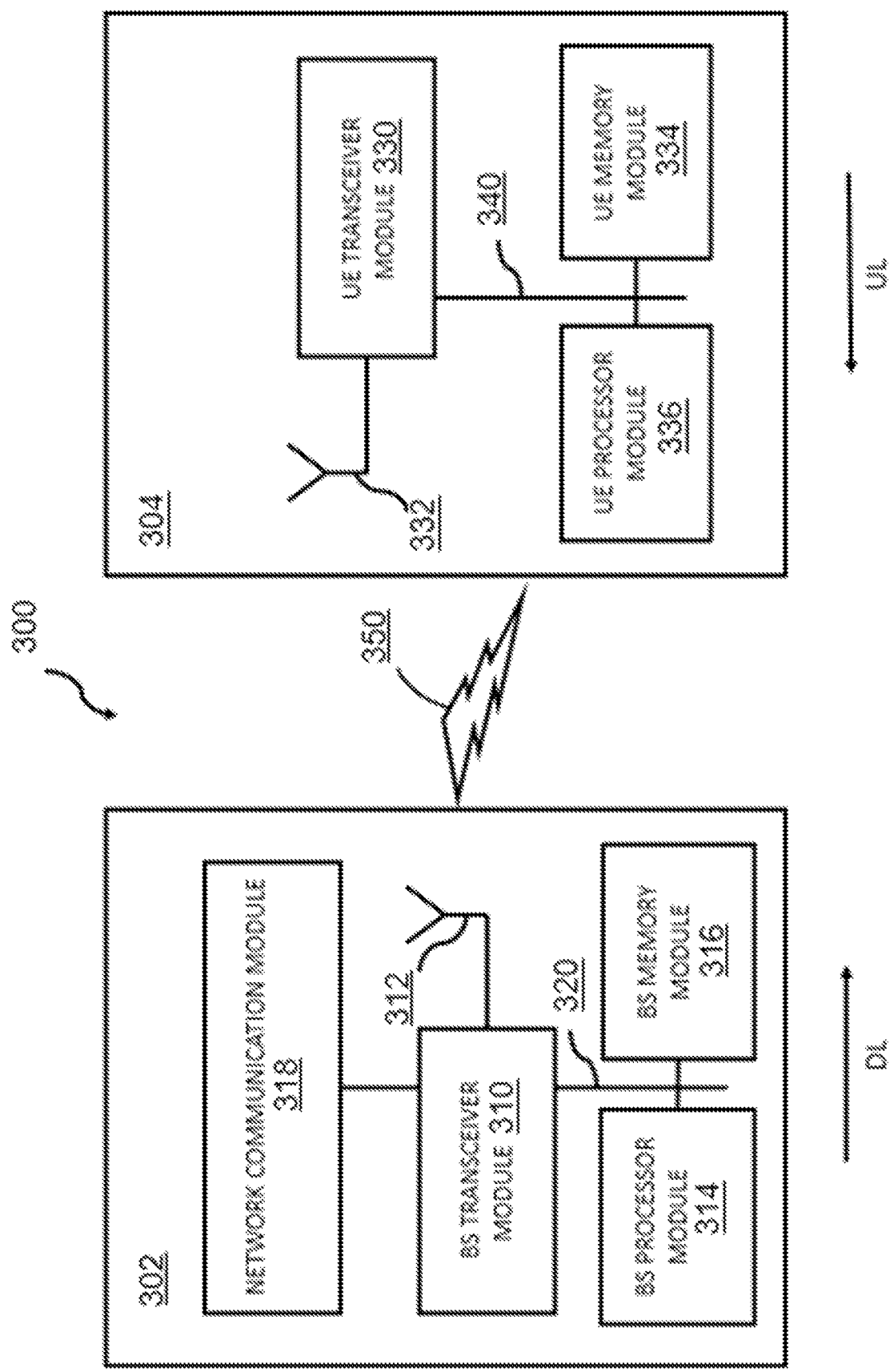
FIG. 3 illustrates block diagrams of an example base station and a user equipment device, in accordance with some embodiments of the present disclosure.

FIG. 3 illustrates a block diagram of an example wireless communication system 300 for transmitting and receiving wireless communication signals (e.g., OFDM/OFDMA signals) in accordance with some embodiments of the present solution. The system 300 may include components and elements configured to support known or conventional operating features that need not be described in detail herein. In one illustrative embodiment, system 300 can be used to communicate (e.g., transmit and receive) data symbols in a wireless communication environment such as the wireless communication environment 300 of FIG. 3, as described above.

System 300 generally includes a base station 302 (hereinafter "BS 302") and a user equipment device 304 (hereinafter "UE 304"). The BS 302 includes a BS (base station) transceiver module 310, a BS antenna 312, a BS processor module 314, a BS memory module 316, and a network communication module 318, each module being coupled and interconnected with one another as necessary via a data communication bus 320. The UE 304 includes a UE (user equipment) transceiver module 330, a UE antenna 332, a UE memory module 334, and a UE processor module 336, each module being coupled and interconnected with one another as necessary via a data communication bus 340. The BS 302 communicates with the UE 304 via a communication channel 350, which can be any wireless channel or other medium suitable for transmission of data as described herein.

As would be understood by persons of ordinary skill in the art, system 300 may further include any number of modules other than the modules shown in FIG. 3. Those skilled in the art will understand that the various illustrative blocks, modules, circuits, and processing logic described in connection with the embodiments disclosed herein may be implemented in hardware, computer-readable software, firmware, or any practical combination thereof. To clearly illustrate this interchangeability and compatibility of hardware, firmware, and software, various illustrative components, blocks, modules, circuits, and steps are described generally in terms of their functionality. Whether such functionality is implemented as hardware, firmware, or software can depend upon the particular application and design constraints imposed on the overall system. Those familiar with the concepts described herein may implement such functionality in a suitable manner for each particular application, but such implementation decisions should not be interpreted as limiting the scope of the present disclosure.

In accordance with some embodiments, the UE transceiver 330 may be referred to herein as an "uplink" transceiver 330 that includes a radio frequency (RF) transmitter and a RF receiver each comprising circuitry that is coupled to the antenna 332. A duplex switch (not shown) may alternatively couple the uplink transmitter or receiver to the uplink antenna in time duplex fashion. Similarly, in accordance with some embodiments, the BS transceiver 310 may be referred to herein as a "downlink" transceiver 310 that includes a RF transmitter and a RF receiver each comprising circuitry that is coupled to the antenna 312. A downlink duplex switch may alternatively couple the downlink transmitter or receiver to the downlink antenna 312 in time duplex fashion. The operations of the two transceiver modules 310 and 330 may be coordinated in time such that the uplink receiver circuitry is coupled to the uplink antenna 332 for reception of transmissions over the wireless transmission link 350 at the same time that the downlink transmitter is coupled to the downlink antenna 312. Conversely, the operations of the two transceivers 310 and 330 may be coordinated in time such that the downlink receiver is coupled to the downlink antenna 312 for reception of transmissions over the wireless transmission link 350 at the same time that the uplink transmitter is coupled to the uplink antenna 332. In some embodiments, there is close time synchronization with a minimal guard time between changes in duplex direction.

The UE transceiver 330 and the base station transceiver 310 are configured to communicate via the wireless data communication link 350 and cooperate with a suitably configured RF antenna arrangement 312/332 that can support a particular wireless communication protocol and modulation scheme. In some illustrative embodiments, the UE transceiver 310 and the base station transceiver 310 are configured to support industry standards such as the Long-Term Evolution (LTE) and emerging 5G standards, and the like. It is understood, however, that the present disclosure is not necessarily limited in application to a particular standard and associated protocols. Rather, the UE transceiver 330 and the base station transceiver 310 may be configured to support alternate, or additional, wireless data communication protocols, including future standards or variations thereof.

In accordance with various embodiments, the BS 302 may be an evolved node B (eNB), a serving eNB, a target eNB, a femto station, or a pico station, for example. In some embodiments, the UE 304 may be embodied in various types of user devices such as a mobile phone, a smart phone, a personal digital assistant (PDA), tablet, laptop computer, wearable computing device, etc. The processor modules 314 and 336 may be implemented, or realized, with a general purpose processor, a content addressable memory, a digital signal processor, an application specific integrated circuit, a field programmable gate array, any suitable programmable logic device, discrete gate or transistor logic, discrete hardware components, or any combination thereof, designed to perform the functions described herein. In this manner, a processor may be realized as a microprocessor, a controller, a microcontroller, a state machine, or the like. A processor may also be implemented as a combination of computing devices, e.g., a combination of a digital signal processor and a microprocessor, a plurality of microprocessors, one or more microprocessors in conjunction with a digital signal processor core, or any other such configuration.

Furthermore, the steps of a method or algorithm described in connection with the embodiments disclosed herein may be embodied directly in hardware, in firmware, in a software module executed by processor modules 314 and 336, respectively, or in any practical combination thereof. The memory modules 316 and 334 may be realized as RAM memory, flash memory, ROM memory, EPROM memory, EEPROM memory, registers, a hard disk, a removable disk, a CD-ROM, or any other form of storage medium known in the art. In this regard, memory modules 316 and 334 may be coupled to the processor modules 310 and 330, respectively, such that the processors modules 310 and 330 can read information from, and write information to, memory modules 316 and 334, respectively. The memory modules 316 and 334 may also be integrated into their respective processor modules 310 and 330. In some embodiments, the memory modules 316 and 334 may each include a cache memory for storing temporary variables or other intermediate information during execution of instructions to be executed by processor modules 310 and 330, respectively. Memory modules 316 and 334 may also each include non-volatile memory for storing instructions to be executed by the processor modules 310 and 330, respectively.

The network communication module 318 generally represents the hardware, software, firmware, processing logic, and/or other components of the base station 302 that enable bi-directional communication between base station transceiver 310 and other network components and communication nodes configured to communication with the base station 302. For example, network communication module 318 may be configured to support internet or WiMAX traffic. In a typical deployment, without limitation, network communication module 318 provides an 802.3 Ethernet interface such that base station transceiver 310 can communicate with a conventional Ethernet based computer network. In this manner, the network communication module 318 may include a physical interface for connection to the computer network (e.g., Mobile Switching Center (MSC)). The terms "configured for," "configured to" and conjugations thereof, as used herein with respect to a specified operation or function, refer to a device, component, circuit, structure, machine, signal, etc., that is physically constructed, programmed, formatted and/or arranged to perform the specified operation or function.

The Open Systems Interconnection (OSI) Model (referred to herein as, "open system interconnection model") is a conceptual and logical layout that defines network communication used by systems (e.g., wireless communication device, wireless communication node) open to interconnection and communication with other systems. The model is broken into seven subcomponents, or layers, each of which represents a conceptual collection of services provided to the layers above and below it. The OSI Model also defines a logical network and effectively describes computer packet transfer by using different layer protocols. The OSI Model may also be referred to as the seven-layer OSI Model or the seven-layer model. In some embodiments, a first layer may be a physical layer. In some embodiments, a second layer may be a Medium Access Control (MAC) layer. In some embodiments, a third layer may be a Radio Link Control (RLC) layer. In some embodiments, a fourth layer may be a Packet Data Convergence Protocol (PDCP) layer. In some embodiments, a fifth layer may be a Radio Resource Control (RRC) layer. In some embodiments, a sixth layer may be a Non-Access Stratum (NAS) layer or an Internet Protocol (IP) layer, and the seventh layer being the other layer.

2. Configuring per UE Device Types and/or Network

In a first aspect (sometimes referred to as, "Group 1"), the present disclosure is directed to systems and methods for SIB broadcasting mechanism and/or new content in SIB.

In a second aspect (sometimes referred to as, "Group 2"), the present disclosure is directed to systems and methods that configure (e.g., initialize, arrange, etc.) multiple values of Koffset in SIB 1, an association (e.g., relationship) between SSB/TCI and Koffset, (if needed), and/or a beam indication.

In a third aspect (sometimes referred to as, "Group 3"), the present disclosure is directed to systems and methods that configure a value of Koffset in SIB x for each beam, an association (e.g., relationship) between TCI(beam) and Koffset. (if needed), and/or a beam indication 2.1 Group 1: General Structure In some embodiments, the BS (e.g., BS 202 in FIG. 2) broadcasts SSB to UEs in a cell, and broadcasts SIB including value of a scheduling offset. In some embodiments, the BS broadcasts SSB to UEs in a cell, and broadcasts SIB 1 including multiple values of Koffset. In some embodiments the BS broadcasts SSB to UEs in a cell, and broadcasts SIB x (x>=1) including a value of Koffset. In some embodiments, the BS broadcasts SSB to UEs in a cell, and broadcasts SIB x (x>=1) including satellite status information, or time stamp information. In some embodiments, the satellite status information includes at least one of: a location of a satellite, or an ephemeris of the satellite.

In some embodiments, some (e.g., one or more) or all the UEs in the cell receive (e.g., retrieve, acquire) the SIB 1, including multiple values of Koffset. The BS, in some embodiments, may indicate the Koffset for a target UE.

In some embodiments, a value of Koffset is configured and/or associated with a beam. In some embodiments, a UE only decodes a Koffset in the received SIB x (multiplexing for different beams). The BS, in some embodiments, may indicate the beam for a target UE.

2.2 Group 2: Beam Related Methods

The present disclosure provides a technical solution to the technical problem of Group 2 by indicating on which Koffset is used by a target UE (e.g., UE 204 in FIG. 2).

Figure 4:
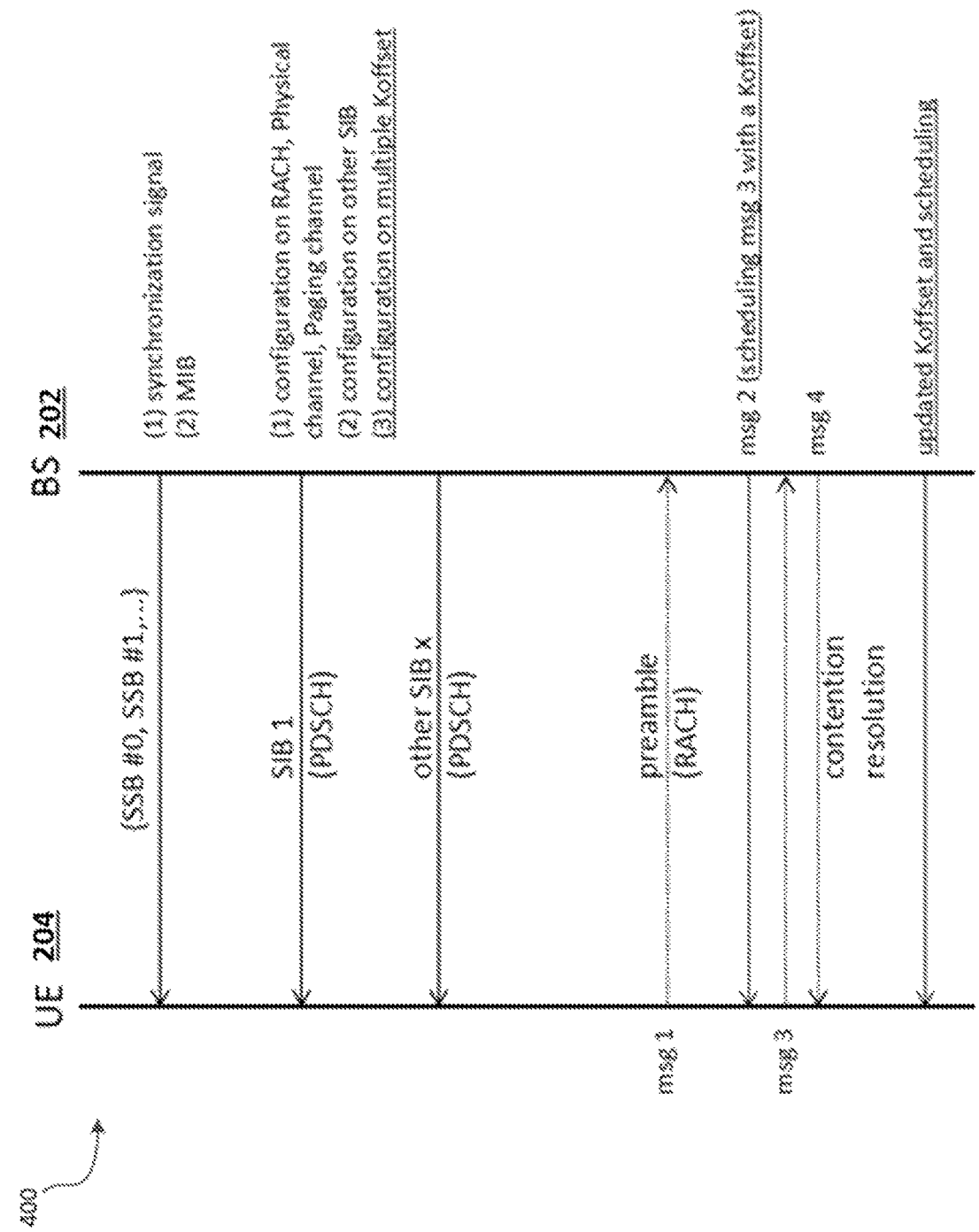
FIG. 4 is a flow diagram depicting an example work procedure, in accordance with an embodiment of the present disclosure.

FIG. 4 is a flow diagram depicting an example work procedure, in accordance with an embodiment of the present disclosure. The work procedure shows the communication between a UE (e.g., UE 204 in FIG. 2) and a BS (e.g., UE 202 in FIG. 2). The BS, in some embodiments, transmits a first message (shown in FIG. 4 as, "SSB #0, SSB #1") to the UE. The BS, in some embodiments, transmits a second message (shown in FIG. 4 as, "SSB #0, SSB #1") to the UE. The BS, in some embodiments, transmits a third message (shown in FIG. 4 as, "other SIB x") to the UE. The BS, in some embodiments, receives a fourth message (shown in FIG. 4 as, "preamble") from the UE. The BS, in some embodiments, transmits a fifth message (shown in FIG. 4 as, "msg 2") to the UE. The BS, in some embodiments, receives a sixth message (shown in FIG. 4 as, "msg 3") from the UE. The BS, in some embodiments, transmits a seventh message (shown in FIG. 4 as, "msg 4") to the UE. The BS, in some embodiments, transmits an eighth message (shown in FIG. 4 as, "scheduling") to the UE.

Figure 5:
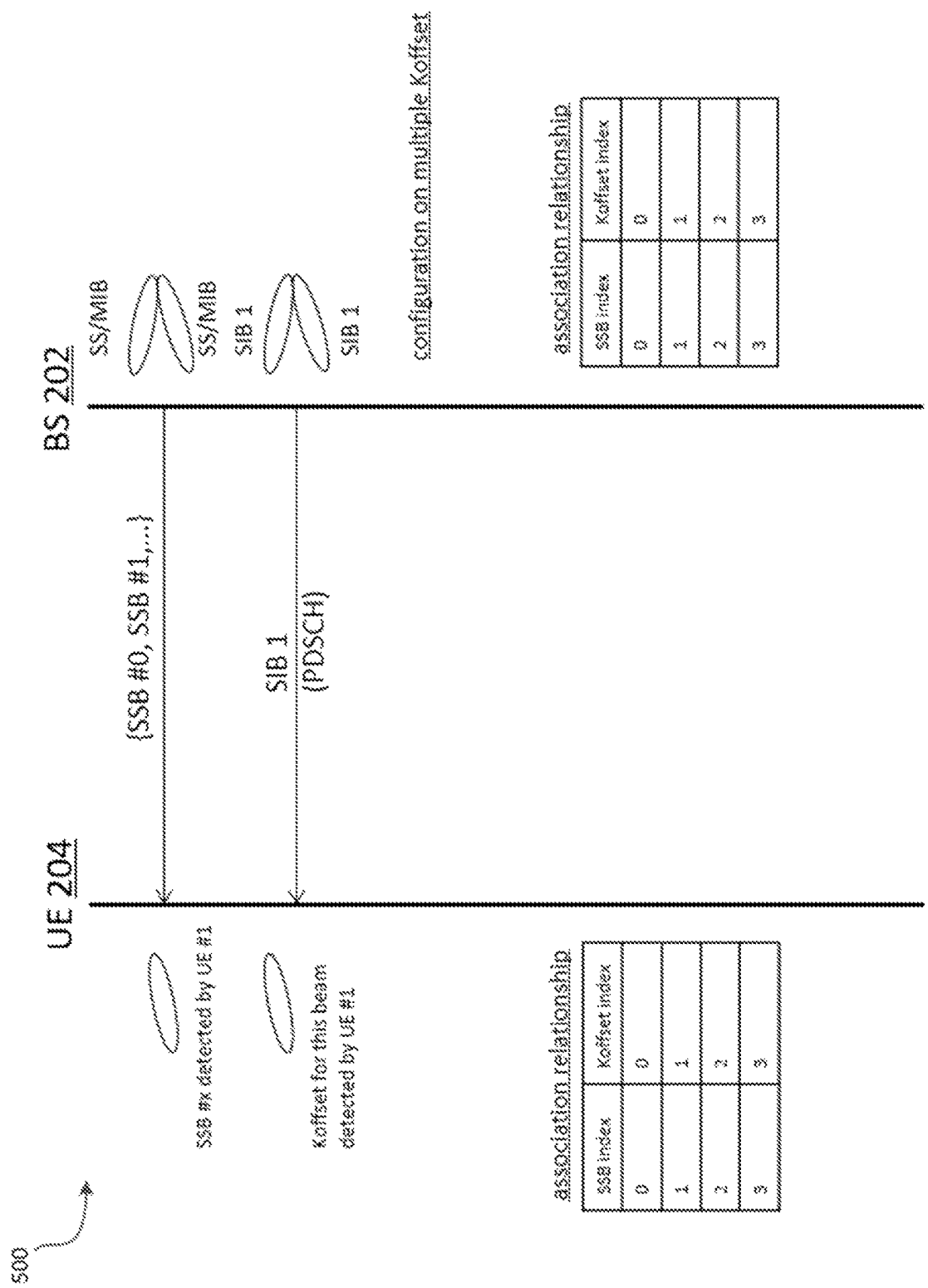
FIG. 5 is a flow diagram depicting an example procedure for an indication of the Koffset, in accordance with an embodiment of the present disclosure.

FIG. 5 is a flow diagram depicting an example procedure for an indication of the Koffset, in accordance with an embodiment of the present disclosure. The flow diagram shows the communication between a UE (e.g., UE 204 in FIG. 2) and a BS (e.g., UE 202 in FIG. 2). As shown in FIG. 5, the UE may detect (e.g., determine, identify) Koffset for the receiving beam according to association (e.g., relationship) between SSB, Koffset in a default way.

Figure 6:
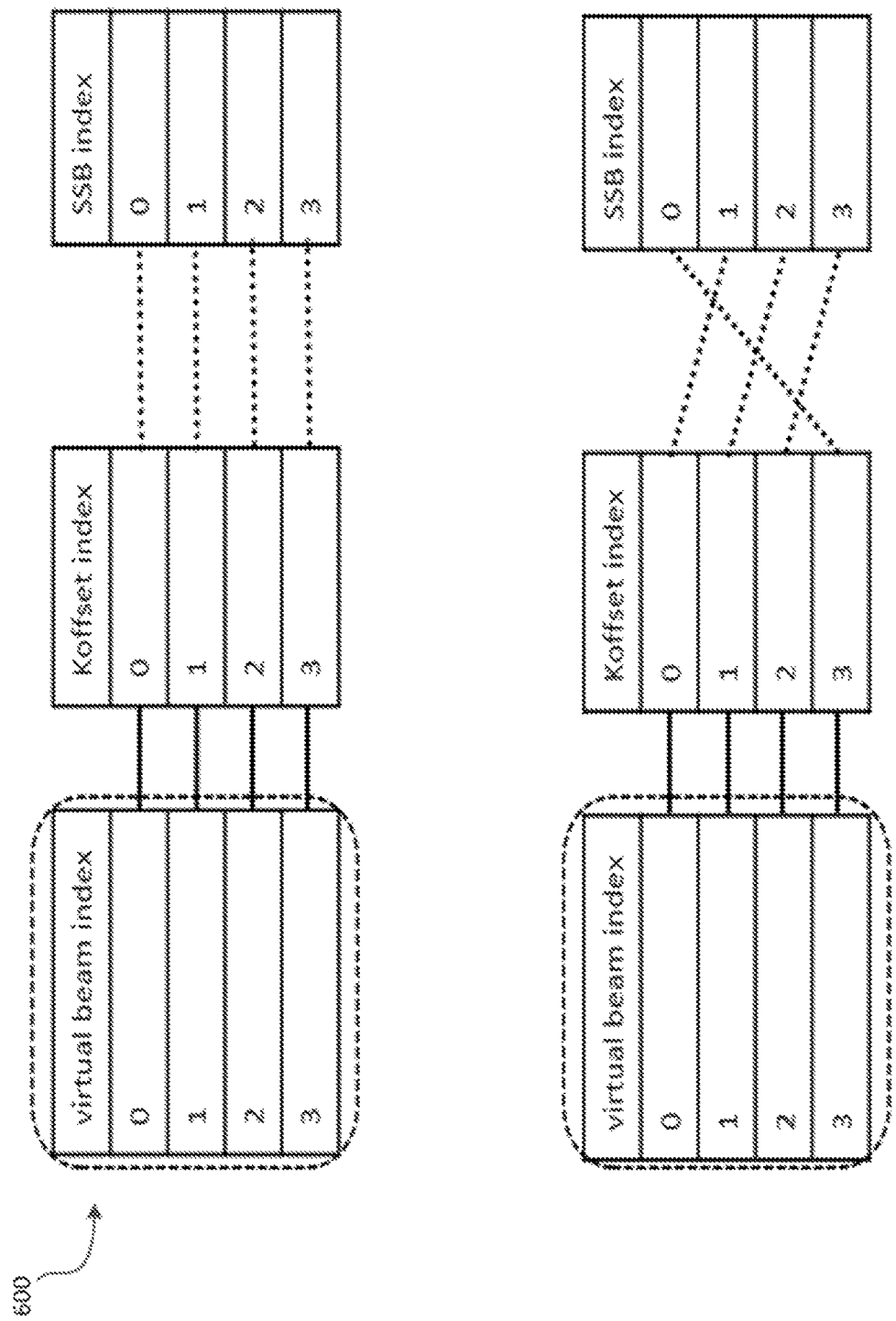
FIG. 6 is a block diagram depicting an example association between Koffset and SSB, in accordance with an embodiment of the present disclosure.

As discussed below, the BS and/or the UE may define and/or adjust the association among (between) at least two of SSB, transmission beam, and Koffset, FIG. 6 is a block diagram depicting an example association between Koffset and SSB, in accordance with an embodiment of the present disclosure. In some embodiments, the BS and/or the UE may define the association (e.g., relationship) between Koffset and SSB. In some embodiments, the BS and/or the UE may define the association between Koffset and SSB, virtual beam. In some embodiments, the BS and/or the UE may define the association between Koffset and TCI. In some embodiments, the association between Koffset and SSB may be related to a transmission beam and/or a reception beam.

The beam indication, in some embodiments, may be related (e.g., associated) to an indication of Koffset and/or the subsequent reception of transmission as PDCCH/PDSCH, according to at least one of three instances.

In a "first" instance (sometimes referred to as, "a default method"), There is no beam indication for the target UE. In some embodiments, in the first instance, an association is assumed to be established.

From the perspective of a target UE, an SSB is broadcasted (e.g., transmitted) in a corresponding transmission beam, moreover, consequent transmission and/or reception (e.g., PDCCH/PDSCH) for the target UE can assume using the same spatial filter as the SSB, according to a default method. In some embodiments, the Koffset associated with the certain SSB is obtained (e.g., acquired, retrieved) by the target UE.

Figure 7:
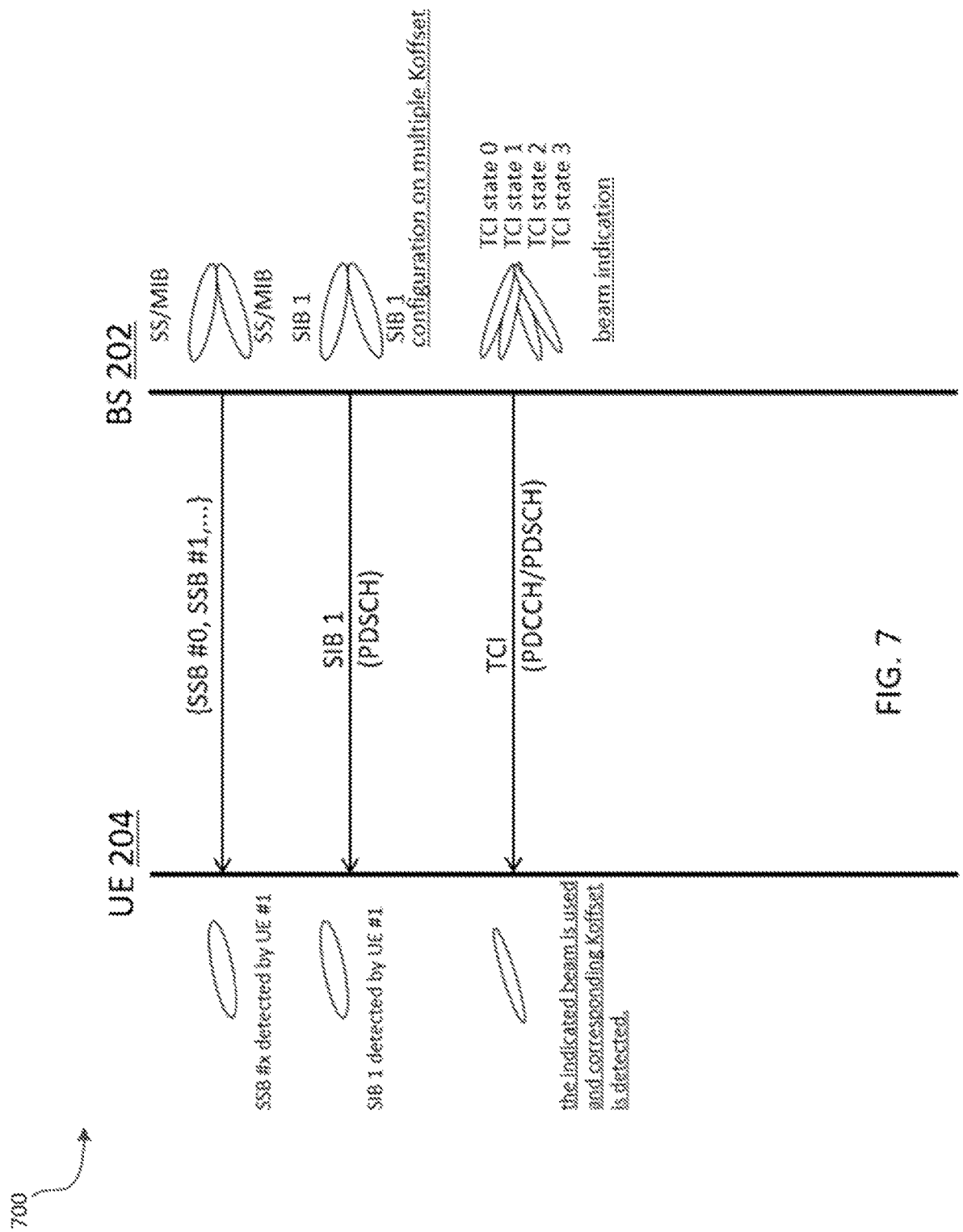
FIG. 7 is a flow diagram depicting an example procedure for an indication of the Koffset, in accordance with an embodiment of the present disclosure.

In a "second" instance, Koffset may be indicated via TCI. For example, FIG. 7 is a flow diagram depicting an example procedure for an indication of the Koffset, in accordance with an embodiment of the present disclosure. A TCI state indication, in some embodiments, is signaled (e.g., transmitted) based on a certain beam, it is used to indicate which beam is used by target UE. The TCI state, in some embodiments, includes information about a reference signal, (e.g., CSI-RS or SSB). A CSI-RS or SSB, in some embodiments, can identify (e.g., determine, detect) a precise beam.

In some embodiments, the transmission/reception (e.g., PDCCH/PDSCH) for the target UE is associated with a certain TCI, and/or the network informs the device it can assume the transmission is done using the same spatial filter as the SSB indicate via TCI.

In some embodiments, assuming an association relationship above is established and with the association relationship between Koffset and the TCI indication, the Koffset may be indicated as a result.

Figure 8:
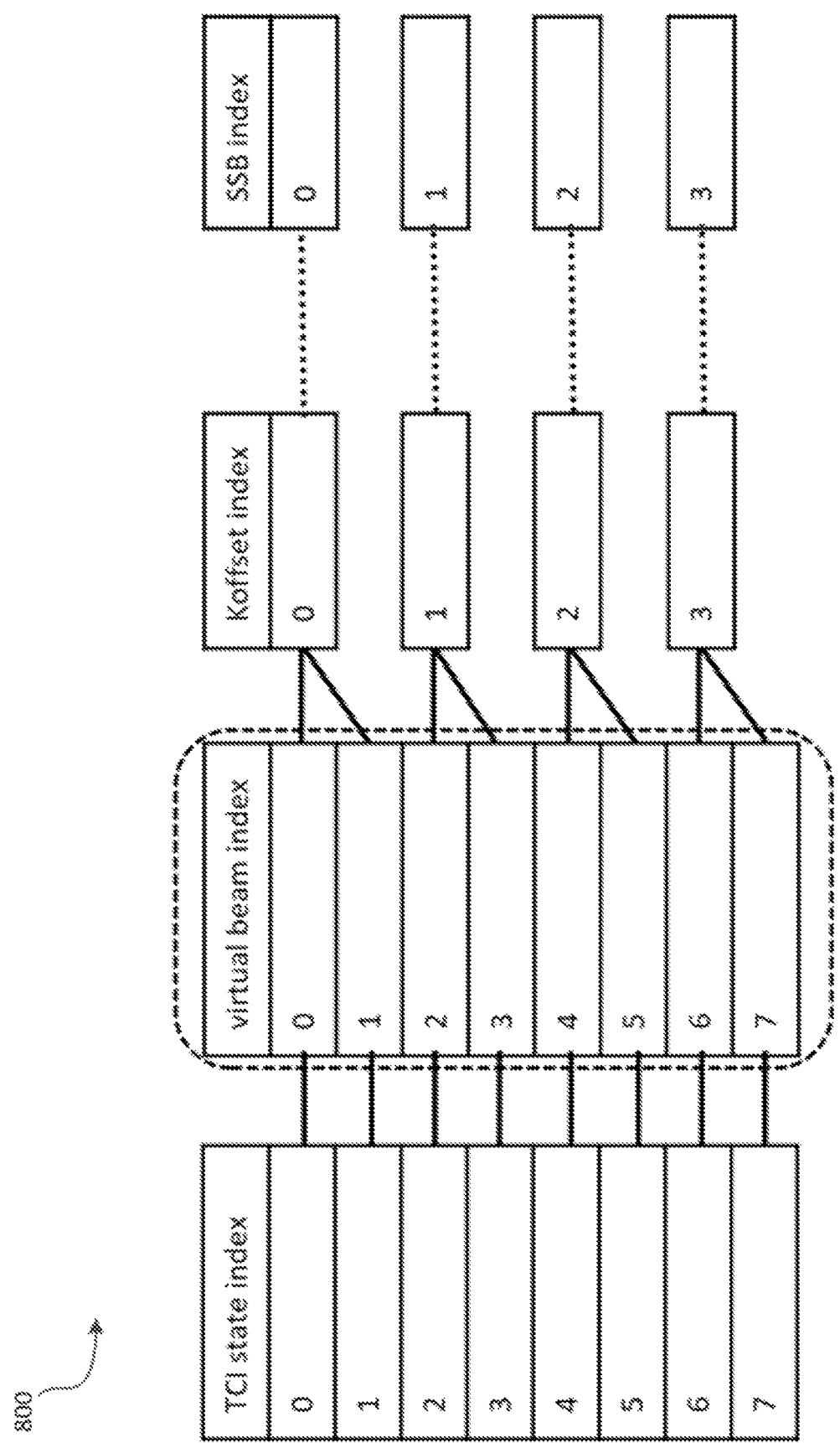
FIG. 8 is a block diagram depicting an example association between TCI state index, virtual beam index, Koffset index, and SSB index, in accordance with an embodiment of the present disclosure.

FIG. 8 is a block diagram depicting an example association between TCI state index, virtual beam index, Koffset index, and SSB index, in accordance with an embodiment of the present disclosure. In some embodiments, the BS and/or the UE may define the association (e.g., relationship) among TCI state index, virtual beam index, Koffset index, and/or SSB index. In some embodiments, the BS and/or the UE may define the association (e.g., relationship) among TCI state index, Koffset index.

In a "third" instance, Koffset may be indicated implicitly. In some embodiments, assistance information is broadcast from BS. In some embodiments, the UE may identify (e.g., determine) the used beam based on the assistance information. In some embodiments, the information may include reference points information corresponding to each beam. In some embodiments, the information may include BWP information corresponding to each beam.

In some embodiments, assuming an association is established and with the association between Koffset and transmission beam and/or the beam indication implicitly, then the Koffset is indicated as a result.

2.2.1 Implementation of Embodiment(s) of Group 2

In a "first" instance (sometimes referred to, "Case 2"), the embodiments are implemented according to SSB based solutions in an initial state. A BS broadcasts SSB to one or more UEs in a cell, and/or broadcasts SIB 1 including multiple values of Koffset.

In some embodiments, assuming an association relationship among at least two of SSB, transmission beam, Koffset, is established. For example, from the UE perspective, the SSB is broadcasted from network with a corresponding Koffset configured. The UE can obtain (e.g., acquire, retrieve) the Koffset according to association relationship between SSB and Koffset, according to a default method.

In some embodiments, SSB is indicated by TCI, and/or corresponding Koffset is indicated.

In a "second instance" (sometimes referred to, "BWP based solutions after accessing the network"), when a UE is successfully access to a network, an active BWP is allocated (e.g., configured, dedicated, reserved) for data transmission in each beam. In some embodiments, assume FDM BWP may be allocated for each beam. From the network perspective, for a BWP demanded for a connected state UE, a corresponding Koffset is configured and/or updated. In this way, for the UEs within a beam service, a common Koffset is configured and/or updated. In addition, the non-adjacent beams may reuse the same BWP, then a maximum value of Koffsets associated to these beams can be configured.

2.3 Group 3: Beam Related Methods

The present disclosure provides a technical solution to the technical problem of Group 3 by designing an indication of the beam/Koffset used by the target UE.

In a "first" instance (sometimes referred to as, "a default method"), the beam indication may be transparent for the target UE. In some embodiments, a UE receives a beam/wireless signal, decoding the received SIB x, x>=1, and the value of Koffset in SIB x may be obtained. Meanwhile, in some embodiments, the association relationship is not needed.

Figure 9:
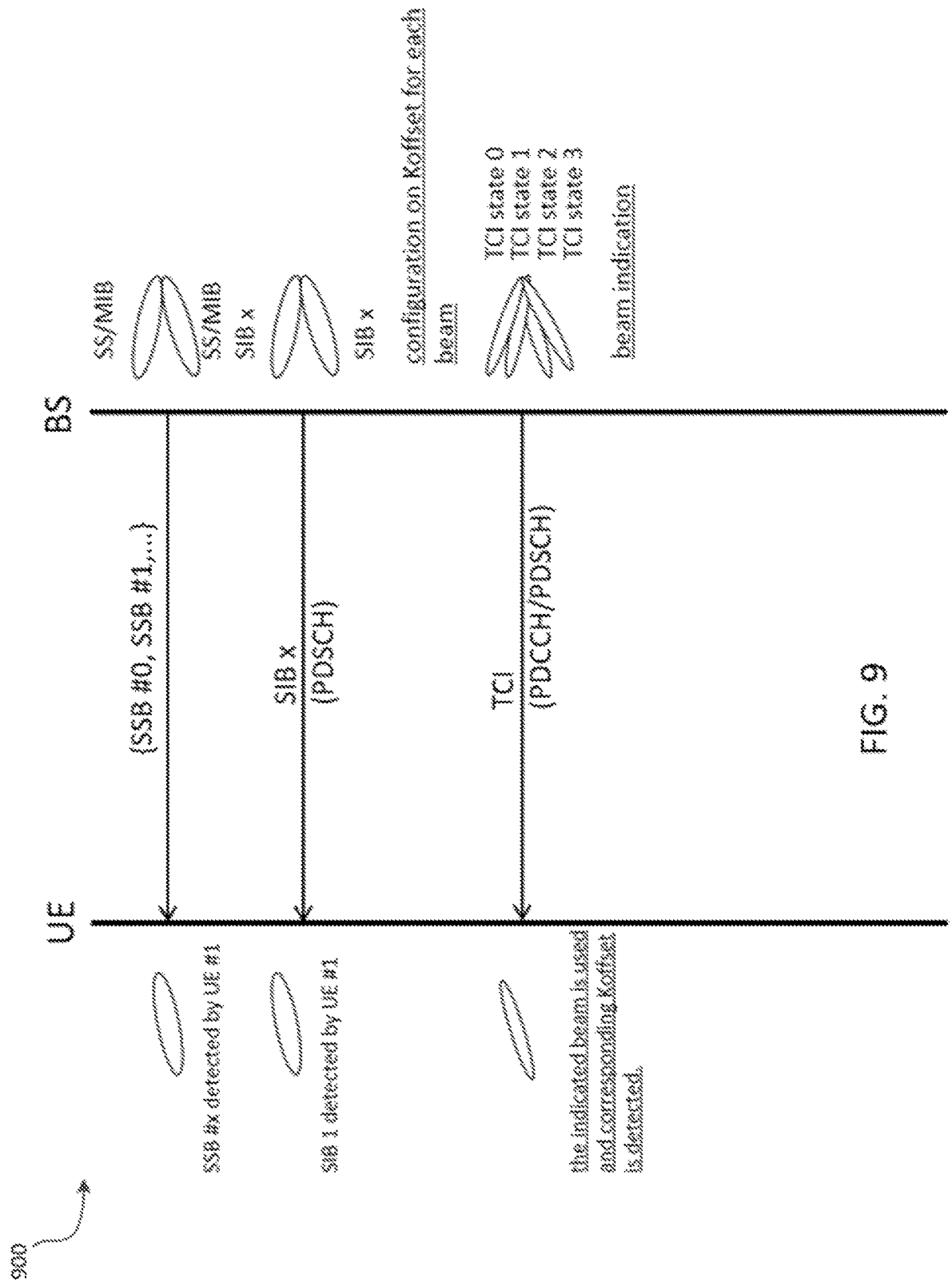
FIG. 9 is a block diagram depicting an example association between Koffset and TCI, in accordance with an embodiment of the present disclosure.

In a "second" instance, the beam indication may be indicated via TCI. For example, FIG. 9 is a block diagram depicting an example association between Koffset and TCI, in accordance with an embodiment of the present disclosure.

Assume a Koffset is contained in SIBx, x>1, the SIBx for different beams may, in some embodiments, multiplex in time/frequency/spatial/code domain.

In some embodiments, the transmission/reception (e.g., PDCCH/PDSCH) for the target UE is associated with a certain TCI, and/or the network informs (e.g., notifies) the device it can assume the transmission is done using the same spatial filter as the beam indicated via TCI.

Figure 10:
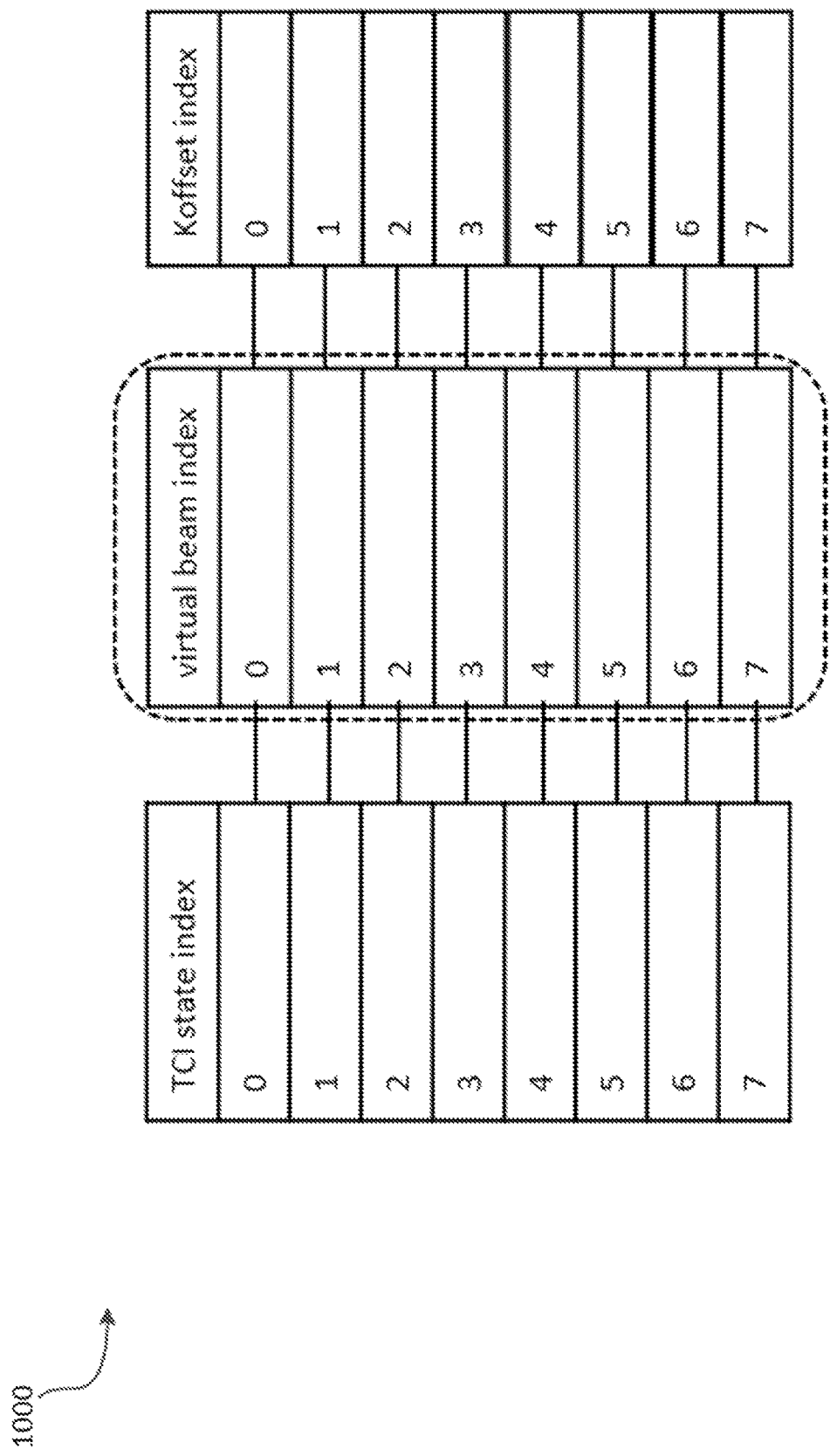
FIG. 10 is a block diagram depicting an example association between TCI state index, virtual beam index, and Koffset index, in accordance with an embodiment of the present disclosure.

FIG. 10 is a block diagram depicting an example association between TCI state index, virtual beam index, and Koffset index, in accordance with an embodiment of the present disclosure. In some embodiments, the BS and/or the UE may define the association (e.g., relationship) between TCI state index, virtual beam index, and Koffset index. In some embodiments, the BS and/or the UE may define the association (e.g., relationship) between TCI state index, and Koffset index.

2.3.1 Implementation of Embodiment(s) of Group 3

In a "first" instance (sometimes referred to as "Case 3-1"), the embodiments are implemented by SIB broadcast and/or beam based solutions. In some embodiments, a BS broadcasts SSB to one or more UEs in a cell, and/or broadcasts SIB 1 including a value of Koffset for each beam. In some embodiments, a UE receives a beam/wireless signal, decoding the received SIB x, x>=1, and the value of Koffset in SIB x may be obtained. In some embodiments, beam is indicated by TCI, and corresponding Koffset is indicated.

In a "second" instance (sometimes referred to as "Case 3-2"), the embodiments are implemented by multicast. In some embodiments, for connected state UEs, a BS group scheduling SIBx/or PDSCH for multiple UEs. In some embodiments, the content of SIBx/or PDSCH can include a common Koffset for the UEs.

2.4 Group 4: Group Related Methods

In this embodiment, for a group of UEs, a common Koffset is allocated. The UEs in a group may have close locations, or similar channel states.

In a first instance (sometimes referred to as "Case 4-1"), the embodiments are implemented by SIB broadcast, beam based solutions. In some embodiments, BS broadcasts SSB to UEs in a cell, and broadcasts SIB 1 including a value of Koffset for each group.

In some embodiments, a UE in a group receives a beam/wireless signal, decoding the received SIB x, x>=1, and the value of Koffset in SIB x may be obtained.

In some embodiments, the beam is indicated by TCI, and/or corresponding Koffset is indicated.

In a second instance (sometimes referred to as "Case 4-2"), the embodiments are implemented by BWP based solutions after accessing the network. In some embodiments, when a UE is successfully access to a network, an active BWP is allocated for data transmission in each group. In some embodiments, assume FDM BWP may be allocated for each group. In some embodiments, from the network perspective, for a BWP demanded for a connected state UE, a corresponding Koffset is configured and/or updated. In this way, for the UEs within a group, a common Koffset is configured and/or updated.

In a third instance (sometimes referred to as "Case 4-3"), the embodiments are implemented based on multicast. In some embodiment, for connected state UEs, BS group scheduling SIBx/or PDSCH for a group of UEs. In some embodiments, the content of SIBx and/or PDSCH can include a common Koffset for the UEs.

2.5 Group 5: Update Per UE after Accessing the Network

In a first instance (sometimes referred to as "Case 5-1"), the embodiments are implemented based on updating per UE. In some embodiments, the update can be a new Koffset for each UE, a dedicated Koffset is allocated.

In some embodiments, the update is based on an adjustment value, which indicates the change and/or adjustment to the previous old value. Moreover, a connected state UE can be scheduled, and informed of the signaling via PDCCH, RRC signaling (e.g., msg 4/msg B), MAC CE.

In a second instance (sometimes referred to as "Case 5-2"), the embodiments are implemented based on updating per UE, where UEs in a beam share a common Koffset. In this case, comparing to case 5-1, a limitation is added that the value of Koffset of a beam is one value, e.g. base on the beam center reference point or beam edge reference point. BS is assumed to know which beam center reference point or beam edge reference point the UE belongs to.

2.6 Group 6: Additional Embodiments with GNSS Assistance

In this instance, the BS broadcasts SIB, including multiple Koffsets. In some embodiments, assume UE itself calculates a common TA with assistance of GNSS capability, by comparing the calculated common TA and the received multiple Koffset, with unit conversion, the most approximate Koffset may be adopted.

In some embodiments, the BS broadcasts SIB, including multiple Koffsets and multiple service link common TA. In some embodiments, each Koffset is associated to a service link common TA. In some embodiments, assume UE itself calculates a common TA with assistance of GNSS capability, by finding an equivalent value with one of received multiple service link common TA, and the corresponding Koffset may be adopted.

In some embodiments, for NB-IoT scenario, the UE procedure for reporting ACK/NACK (Hybrid Automatic Repeat Request-Acknowledge) may be that, transmitting HARQ-ACK on PUSCH within slot n+K1+Koffset; where for the last repetition of PDSCH reception ending in slot$^n$ or a SPS PDSCH release through a PDCCH, and the last repetition of PDCCH reception ending in slot$^n$, where K1 is a number of slots and is indicated by the DCI or by higher layer signaling.

In some embodiments, for PUR (Preconfigured UL resources) cases for NB-IoT or LTE-M scenarios, the PUR Search Space window should be extended by a value of Koffset.

In some embodiments, broadcasting, by the wireless communication node, a physical broadcast channel (PBCH) and a system information block, thereby causing a wireless communication device that received the PBCH and the system information block to determine one of the plurality of scheduling offsets.

In some embodiments, broadcasting, by the wireless communication node, a system information block in TDM resource or FDM resource, thereby causing a wireless communication device that received the system information block to determine the scheduling offset.

In some embodiments, broadcasting, by the wireless communication node, a system information block in narrow frequency band or a carrier, thereby causing a wireless communication device that received the system information block to determine the scheduling offset.

In some embodiments, broadcasting, by a wireless communication node to a wireless communication device, a system information block that indicates configuration of different resources. In some embodiments, the configuration includes at least one of:

a common value of timing advance, a common value for frequency pre-compensation for downlink. In some embodiments, the different resources include at least one of different BWPs, different narrow frequency bands or carriers, different virtual beams index.

In some embodiments, broadcasting, by the wireless communication node to a wireless communication device, a system information block in a granted time gap.

In some embodiments, broadcasting, by the wireless communication node to a wireless communication device, a system information block in a downlink gap.

Figure 11:
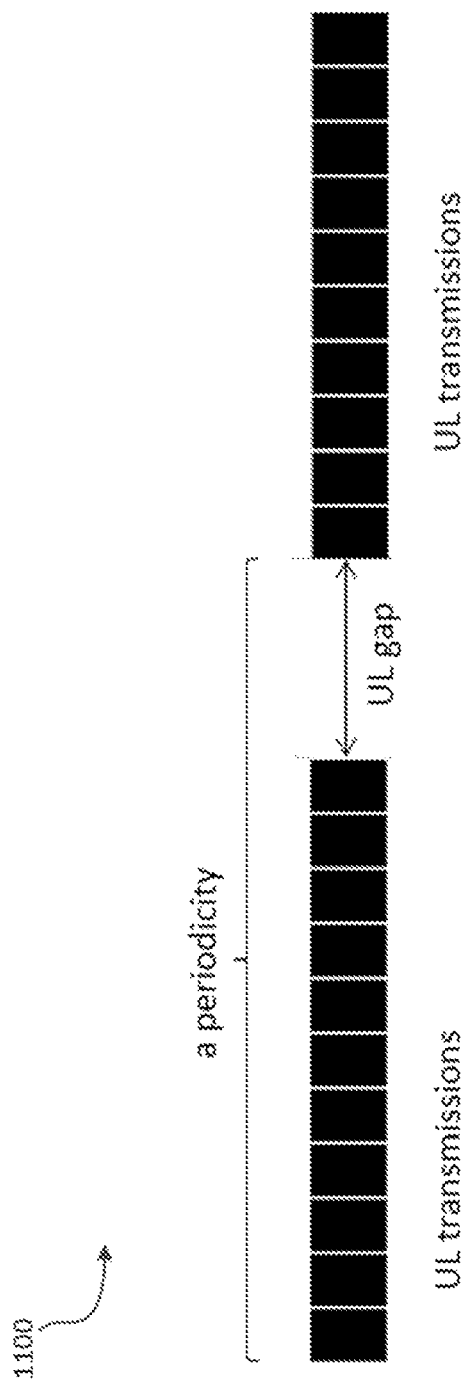
FIG. 11 illustrates an example of UL gap that is inserted after a certain of continuous of uplink transmissions.

For example, FIG. 11 illustrates an example of UL gap (e.g., granted time gap) that is inserted after a certain of continuous of uplink transmissions. The uplink gap may be a granted time gap between a first transmission and a second transmission according to a configuration from a wireless communication node, wherein the first transmission includes the wireless communication device transmitting a plurality of first uplink messages to the wireless communication node and the second transmission includes the wireless communication device transmitting a plurality of second uplink messages to the wireless communication node. In other embodiments, there may be a default configuration such that the uplink gap is a fixed value. For example, the gap is 40 ms and may be configured to be inserted after a certain period of time.

The downlink gap may be a granted time gap between a first transmission and a second transmission according to a configuration from a wireless communication node, wherein the first transmission includes the wireless communication device transmitting a plurality of first downlink messages to the wireless communication node and the second transmission includes the wireless communication device transmitting a plurality of second downlink messages to the wireless communication node. In other embodiments, there may be a default configuration such that the downlink gap is a fixed value. For example, the gap is 40 ms and may be configured to be inserted after a certain period of time.

In some embodiments, the UE in RRC connected state is configured to receive the system information in a granted time gap. In some embodiments, the granted time gap may be a default configuration such that the uplink gap or downlink gap is a fixed value. For example, a gap of 40 ms may be configured to be inserted after a certain period of time. In other embodiments, the granted time gap may be a dedicated gap. For example, a gap of x ms may be configured before the transmission, or may be configured to be inserted after a certain period of time during continuous transmissions, wherein x is an integer.

In some embodiments, the system information includes at least one of: a time stamp, a real-time PVT (position, velocity, time) information of the satellite, an ephemeris of the satellite, a common value of timing advance, or a common value for frequency Doppler shift.

In some embodiments, the BS configures an enable signaling to enable/disable receiving system information within a granted time gap. For example, enabling a UE to receive SI within a granted time gap. In some embodiments, BS configures a reception duration (granted time gap) for receiving system information during UL transmission, and UE drop the UL transmission if it collides with the reception duration.

While various embodiments of the present solution have been described above, it should be understood that they have been presented by way of example only, and not by way of limitation. Likewise, the various diagrams may depict an example architectural or configuration, which are provided to enable persons of ordinary skill in the art to understand example features and functions of the present solution. Such persons would understand, however, that the solution is not restricted to the illustrated example architectures or configurations, but can be implemented using a variety of alternative architectures and configurations. Additionally, as would be understood by persons of ordinary skill in the art, one or more features of one embodiment can be combined with one or more features of another embodiment described herein. Thus, the breadth and scope of the present disclosure should not be limited by any of the above-described illustrative embodiments.

It is also understood that any reference to an element herein using a designation such as "first," "second," and so forth does not generally limit the quantity or order of those elements. Rather, these designations can be used herein as a convenient means of distinguishing between two or more elements or instances of an element. Thus, a reference to first and second elements does not mean that only two elements can be employed, or that the first element must precede the second element in some manner.

Additionally, a person having ordinary skill in the art would understand that information and signals can be represented using any of a variety of different technologies and techniques. For example, data, instructions, commands, information, signals, bits and symbols, for example, which may be referenced in the above description can be represented by voltages, currents, electromagnetic waves, magnetic fields or particles, optical fields or particles, or any combination thereof.

A person of ordinary skill in the art would further appreciate that any of the various illustrative logical blocks, modules, processors, means, circuits, methods and functions described in connection with the aspects disclosed herein can be implemented by electronic hardware (e.g., a digital implementation, an analog implementation, or a combination of the two), firmware, various forms of program (e.g., a computer program product) or design code incorporating instructions (which can be referred to herein, for convenience, as "software" or a "software module"), or any combination of these techniques. To clearly illustrate this interchangeability of hardware, firmware and software, various illustrative components, blocks, modules, circuits, and steps have been described above generally in terms of their functionality. Whether such functionality is implemented as hardware, firmware or software, or a combination of these techniques, depends upon the particular application and design constraints imposed on the overall system. Skilled artisans can implement the described functionality in various ways for each particular application, but such implementation decisions do not cause a departure from the scope of the present disclosure.

Furthermore, a person of ordinary skill in the art would understand that various illustrative logical blocks, modules, devices, components and circuits described herein can be implemented within or performed by an integrated circuit (IC) that can include a general purpose processor, a digital signal processor (DSP), an application specific integrated circuit (ASIC), a field programmable gate array (FPGA) or other programmable logic device, or any combination thereof. The logical blocks, modules, and circuits can further include antennas and/or transceivers to communicate with various components within the network or within the device. A general purpose processor can be a microprocessor, but in the alternative, the processor can be any conventional processor, controller, or state machine. A processor can also be implemented as a combination of computing devices, e.g., a combination of a DSP and a microprocessor, a plurality of microprocessors, one or more microprocessors in conjunction with a DSP core, or any other suitable configuration to perform the functions described herein.

If implemented in software, the functions can be stored as one or more instructions or code on a computer-readable medium. Thus, the steps of a method or algorithm disclosed herein can be implemented as software stored on a computer-readable medium. Computer-readable media includes both computer storage media and communication media including any medium that can be enabled to transfer a computer program or code from one place to another. A storage media can be any available media that can be accessed by a computer. By way of example, and not limitation, such computer-readable media can include RAM, ROM, EEPROM, CD-ROM or other optical disk storage, magnetic disk storage or other magnetic storage devices, or any other medium that can be used to store desired program code in the form of instructions or data structures and that can be accessed by a computer.

In this document, the term "module" as used herein, refers to software, firmware, hardware, and any combination of these elements for performing the associated functions described herein. Additionally, for purpose of discussion, the various modules are described as discrete modules; however, as would be apparent to one of ordinary skill in the art, two or more modules may be combined to form a single module that performs the associated functions according embodiments of the present solution.

Additionally, memory or other storage, as well as communication components, may be employed in embodiments of the present solution. It will be appreciated that, for clarity purposes, the above description has described embodiments of the present solution with reference to different functional units and processors. However, it will be apparent that any suitable distribution of functionality between different functional units, processing logic elements or domains may be used without detracting from the present solution. For example, functionality illustrated to be performed by separate processing logic elements, or controllers, may be performed by the same processing logic element, or controller. Hence, references to specific functional units are only references to a suitable means for providing the described functionality, rather than indicative of a strict logical or physical structure or organization.

Various modifications to the embodiments described in this disclosure will be readily apparent to those skilled in the art, and the general principles defined herein can be applied to other embodiments without departing from the scope of this disclosure. Thus, the disclosure is not intended to be limited to the embodiments shown herein, but is to be accorded the widest scope consistent with the novel features and principles disclosed herein, as recited in the claims below.

The invention claimed is:

1. A wireless communication method, comprising:
    configuring, by a wireless communication node to a wireless communication device, a first resource of at least one different resources for accessing a network by broadcasting, to the wireless communication device, a system information block that indicates configuration of the at least one different resources, the configuration including at least one scheduling offset, wherein the at least one scheduling offset is associated with least one of the different resources; and
    configuring, by the wireless communication node for the wireless communication device, a second resource of the at least one different resources after the wireless communication device accesses the network by sending an adjustment value to the wireless communication device via a medium access control control element (MAC CE) signaling,
    wherein a second scheduling offset that corresponds to the second resource is updated from the at least one scheduling offset that corresponds to the first resource based on the adjustment value.

2. A wireless communication node, comprising:
    at least one processor configured to:
        configure, for a wireless communication device, a first resource of at least one different resources for accessing a network by broadcasting, via a transmitter to the wireless communication device, a system information block that indicates configuration of the at least one different resources, the configuration including at least one scheduling offset, wherein the at least one scheduling offset is associated with at least one of the different resources; and
        configure, for the wireless communication device, a second resource of the at least one different resources after the wireless communication device accesses the network by sending an adjustment value to the wireless communication device via a medium access control control element (MAC CE) signaling,
    wherein a second scheduling offset that corresponds to the second resource is updated from the at least one scheduling offset that corresponds to the first resource based on the adjustment value.

3. A wireless communication method, comprising:
    receiving, by a wireless communication device from a wireless communication node, a configuration of a first resource of at least one different resources for accessing a network, based on a system information block broadcast by the wireless communication node, the system information block indicating the configuration of the at least one different resources, the configuration including at least one scheduling offset, wherein the at least one scheduling offset is associated with at least one of the different resources; and
    receiving, by the wireless communication device after accessing the network, from the wireless communication node, a medium access control control element (MAC CE) signaling including an adjustment value, to configure a second resource of the at least one different resources,
    wherein a second scheduling offset that corresponds to the second resource is updated from the at least one scheduling offset that corresponds to the first resource based on the adjustment value.

4. A wireless communication device, comprising:
    at least one processor configured to:
        receive, via a receiver from a wireless communication node, a configuration of a first resource of at least one different resources for accessing a network, based on a system information block broadcast by the wireless communication node, the system information block indicating the configuration of the at least one different resources, the configuration including at least one scheduling offset, wherein the at least one scheduling offset is associated with at least one of the different resources; and
        receive, via the receiver after accessing the network, from the wireless communication node, a medium access control control element (MAC CE) signaling including an adjustment value, to configure a second resource of the at least one different resources,
    wherein a second scheduling offset that corresponds to the second resource is updated from the at least one scheduling offset that corresponds to the first resource based on the adjustment value.

* * * * *